Oct. 1, 1968 G. F. BYRNE 3,403,850

PUNCH TAPE DATA LOGGING APPARATUS

Filed March 3, 1966 2 Sheets-Sheet 1

INVENTOR
GAVIN FRANCIS BYRNE

BY Sughrue, Rothwell, Mion, Zinn & Macpeak

ATTORNEYS

PUNCH TAPE DATA LOGGING APPARATUS
Filed March 3, 1966 2 Sheets-Sheet 2
FIG. 2
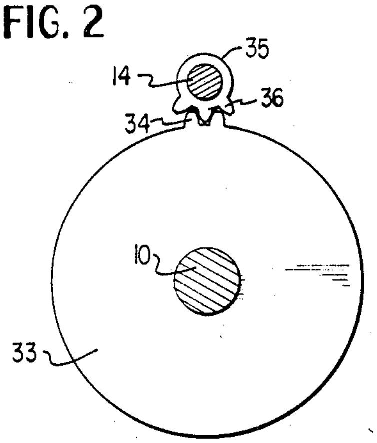
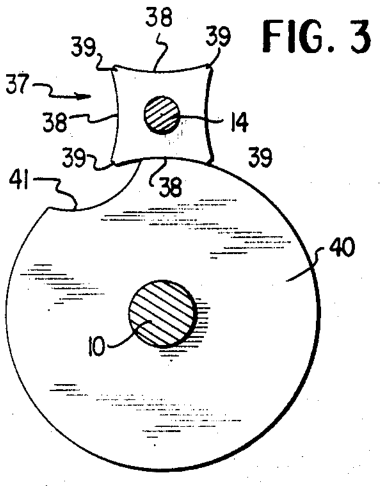
FIG. 3
FIG. 4
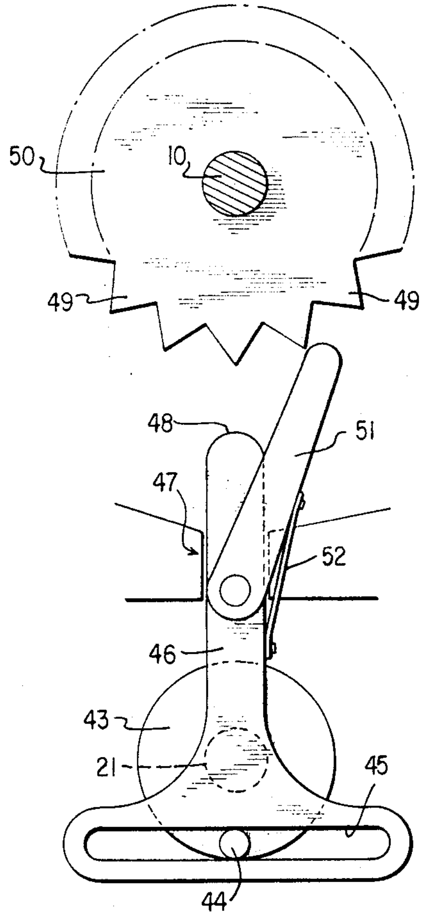
53 54
| DECIMAL EQUIVALENT | | | | | ANGULAR POSITION |
|---|---|---|---|---|---|
| 1 | O | O | O | X | 22.5° |
| 2 | O | O | X | O | 45° |
| 3 | O | O | X | X | 67.5° |
| 4 | O | X | O | O | 90° |
| 5 | O | X | O | X | |
| 6 | O | X | X | O | 135° |
| 7 | O | X | X | X | |
| 8 | X | O | O | O | 180° |
| 9 | X | O | O | X | |
| 10 | X | O | X | O | 225° |
| 11 | X | O | X | X | |
| 12 | X | X | O | O | 270° |
| 13 | X | X | O | X | |
| 14 | X | X | X | O | 315° |
| 15 | X | X | X | X | |
| 16 | O | O | O | O | 360° |
17
FIG. 5
INVENTOR
GAVIN FRANCIS BYRNE
BY Sughrue, Rothwell, Mion, Zinn & Macpeak
ATTORNEYS United States Patent Office 3,403,850

Patented Oct. 1, 1968

3,403,850

PUNCH TAPE DATA LOGGING APPARATUS

Gavin F. Byrne, Reid, Australian Capital Territory, Australia, assignor to Commonwealth Scientific and Industrial Research Organization, East Melbourne, Victoria, Australia, a body corporate of Australia Filed Mar. 3, 1966, Ser. No. 531,404
Claims priority, application Australia, Mar. 5, 1965, 55,992/65
4 Claims. (Cl. 234—99)

ABSTRACT OF THE DISCLOSURE

A punch tape data logging aparatus converts the rotational displacement of an input shaft, which may be proportional to the instantaneous value of a variable, to punch tape by utilizing two cylindrical drums mounted on the input shaft, one rigidly and the other freely. The freely mounted drum is coupled to the input shaft through an intermittent movement including a lay shaft and reduction gearing. The drums have relief calibrations and tape perforating punches adjacent the drums are moved by the tape and a female punch frame toward the drum so that the punches engaging the relief calibrations will not punch the tape. The apparatus includes tape feed means which feeds the tape relative to the female punch frame.

This invention relates to punch tape data logging devices, and the main object of the invention is to provide a relatively simple device by means of which a mechanical analogue derived from a chart recorder or any other measuring device having a rotary analogue output can be punched directly onto a tape in a form suitable for processing in a computer.

Another object of the invention is to provide a punch tape data logging device which can be driven by the pen drive or other detecting and/or recording mechanism of a measuring device and is moreover adapted for sequential multichannel operation.

Other aims and objects of the invention will become apparent from the ensuing description.

Broadly, the invention provides a punch tape data logging apparatus comprising an input shaft the rotational displacement of which may be made proportional to the instantaneous value of a variable which has to be logged on tape; at least one cylindrical encoding drum rotationally coupled to said shaft; relief calibrations on the surface of said drum; tape perforating punches disposed adjacent to said drum and arranged radially with reference to said drum; a female punch frame having mating apertures in positions corresponding to the locations of the punches; tape feed means adapted to draw a tape over said female punch frame; and means for periodically causing said female punch frame and said drum to be moved one towards the other in a plane containing said punches, whereby one end of each of said punches is brought against said drum, and the other end of each of those punches, of which the said one end is not in engagement with one of said relief calibrations, is forced through its mating aperture in the female punch frame and in so doing perforates said tape.

Preferably, there are two encoding drums, one of which is directly coupled to the input shaft and moves with it, while the other is freely mounted on the shaft, and is coupled to it via an intermittent movement, a lay shaft and reduction gearing. The calibrations on the encoding drum or drums are preferably holes or grooves, but they can also be stepped projections. Preferably also, the input shaft is provided with register means adapted to locate and secure the encoding drum correctly in position, before punching of the tape takes place, so that jamming of the punches in the encoder drum calibrations is prevented.

In order that the invention may be more fully and completely understood, a presently preferred embodiment thereof will now be described in detail by way of an example with reference to the accompanying drawings, in which FIGURE 1 is a diagrammatic cross-sectional view of the apparatus in accordance with the invention;

FIGURE 2 is a sectional view of the intermittent movement mechanism between the input shaft and the lay shaft;

FIGURE 3 is a sectional view of the lay shaft locking device;

FIGURE 4 is a sectional view of the register means for bringing about correct alignment of the encoding drum with the tape perforating punches;

FIGURE 5 is the developed surface area of a cylindrical encoding drum, showing the location of the holes for a binary scale coding.

Figure 1:
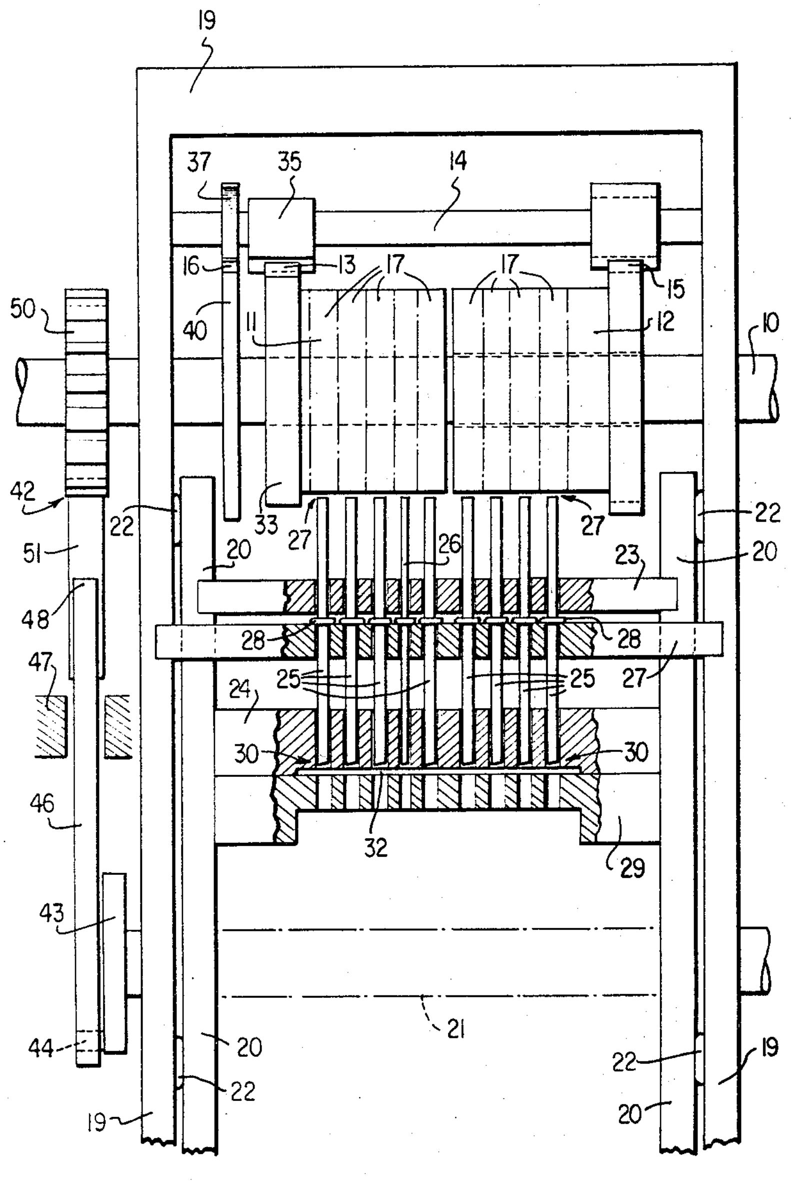

The device illustrated schematically in FIGURE 1 of the drawings has been specifically designed for use with a standard type chart recorder, and has an input shaft 10, which is adapted, in use, to be driven by the pen drive or like detecting and/or recording mechanism of a conventional chart recorder. This may be done either directly or through any convenient reduction or step-up gearing, or other transmission means. A first encoding drum 11 is mounted on, and is directly coupled to, the input shaft 10, being thus constrained to move with it at all times. A second encoding drum 12 is mounted adjacent to the first drum 11, but is not directly connected to the input shaft 10. The second drum 12 is instead driven from the input shaft 10 through an intermittent movement mechanism 13, which is shown in more detail in FIGURE 2, a lay shaft 14 which is driven through said mechanism 13, and a four-to-one reduction gearing 15. The combined effect of this transmission chain is that for each revolution of the input shaft 10 the second encoding drum 12 is caused to move through $1/16$ of a revolution only, as the intermittent motion mechanism 13 is itself designed so as to produce a quarter of a revolution of the lay shaft 14 for each full revolution of the input shaft 10. The input shaft also carries a locking device 16, which serves to prevent any free movement of the lay shaft 14 when not directly driven by the mechanism 13. The locking device 16 is shown in more detail in FIGURE 3.

Each of the drums 11, 12 is provided with four rows 17 of axially spaced holes. The holes in each row are located at intervals around the circumference of each drum, the actual spacing between them depending upon the code used for logging the data on tape. In case of the presently described device, a simple binary code is used, and the holes are located at 22.5° intervals. The arrangement of the holes for this binary coding system is shown in FIGURE 5, from which it can be seen that the drums 11, 12 are designed to represent an increase of one binary digit for each $\frac{1}{16}$ of a revolution of the input shaft. Accordingly, the binary number which can be represented by the two encoding drums 11, 12 used together in the arrangement described ranges from zero to decimal 256, represented by 16 revolutions of the input shaft 10.

The input shaft 10 and the encoding drums 11, 12, as well as associated driving arrangements are all mounted within a housing 19 in any suitable manner. Also located within the housing 19 is a reciprocable carriage 20 which is actuable periodically by any suitable drive motor (not shown) for the apparatus. The drive motor is arranged to turn a main drive shaft 21, which causes reciprocation of the carriage 20 through a conventional cam mechanism, which is also not shown in the drawings.

The carriage 20 is spaced from the housing 19 by nylon wear buttons 22, and carries two transversely disposed guide plates—an upper guide plate 23 and a lower guide plate 24, for a set of eight tape perforating punches 25 and a sprocket hole punch 26. The punches 25, 26 are freely slidable within the guide plates 23, 24, and are arranged parallelly to each other as well as in a plane which is radial to the drums 11, 12. The upper ends 27 of the punches are located close to the surfaces of the two encoding drums 11, 12, four tape perforating punches 25 being disposed next to each drum. The sprocket hole punch 26 is located opposite the drum 11. The ends 27 of the punches are of a size slightly smaller than the calibrating holes in the drums, so that the punch ends can fit into the holes as later described.

The punches 25, 26 also extend through openings in a retractor plate 27, which is fixed to the housing 19 and is located so as to engage the punches between their two guide plates 23, 24. Each of the punches also carries a circlip 28 fitted tightly around its midportion, and being of such size that it cannot penetrate through the openings in the retractor plate 27.

The carriage 20 also carries a female punch plate or frame 29 which is located beneath the operative, or tape cutting, ends 30 of the punches 25, 26, and is provided with holes 31 which are adapted to receive the ends 30 of the punches, when they penetrate through the tape 32. This tape 32 on which the data is to be logged, is arranged to be moved over the female punch frame 29 by means of conventional tape drive and take-up mechanism (not shown), which are again operated by suitable cam mechanisms from the main drive shaft 21 of the drive motor. Likewise, the drive shaft 21 is adapted to cause periodic reciprocation of the carriage 20, whereby the female punch frame 29, and with it the tape 32 are forced against the operative ends 30 of the punches 25, 26, whereby the tape 32 is pressed against the punches. As the punches 25, 26 are freely movable in their guide plates 23, 24 in directions radial to the encoding drums 11, 12, the tape 32 is perforated only by the operating ends 30 of those punches 25, of which the ends 27 are not in alignment with one of the calibration holes in the respective encoding drum. However, if the end 27 of one of the punches 25 is in alignment with a calibrating hole, the tape 32, assisted to some extent by the punch guides 23, 24, is sufficiently strong to push said punch back into the hole on the drum surface, and no punching or perforating of the tape 32 then takes place. In this way the angular displacement of the input shaft at the time of each punching is encoded on the tape in binary notation in one operation. The sprocket hole punch 26 does not have any calibrating holes in the zone of the drum 11 which is engaged by its end 27, so that it punches locating or sprocket holes in the tape 32 on each reciprocating movement of the carriage 20.

During the tape perforating action the carriage 20 is moved upwardly against the punches 25, 26, as seen in FIGURE 1. After each punching operation, when the carriage 20 returns to its normal position, the circlips 28 are engaged by the retractor plate 27, whereby the punches 25, 26 are pulled out from the tape 32, which is thereafter free to advance preparatory to the next punching operation.

FIGURE 2 shows the intermittent movement mechanism 13 in cross-section. It consists of a relatively large diameter gear wheel 33 having only two teeth 34 formed on its periphery, and a smaller diameter gear wheel 35 with three teeth 36 on its periphery, occupying a quarter of its circumference. The larger wheel 33 is fixed to the input shaft, while the smaller wheel 35 is mounted on the lay shaft 14. The tooth sizes are so chosen that the smaller wheel 35 is turned through a quarter revolution whenever the teeth 34 and 36 come into contact.

FIGURE 3 shows the lay shaft locking device 16 in cross-section. This comprises merely a four-pointed gear 37, which is mounted on the lay shaft 14, and has arcuate portions 38 between its four points 39. The gear 37 is engaged by a wheel 40, which is mounted on the input shaft 10 and has a single notch 41 in its circumference. The radius of the wheel 40 is the same as the radius of curvature of the arcuate portions 38, so that, unless the notch 41 comes into the proximity of one of the points 39, the gear 37, and with it the lay shaft 14, are prevented from turning. The arrangement is, of course, that the lay shaft is freed to rotate only when the two gear wheels 33 and 35 are in actual driving engagement, but is locked throughout the remainder of the three-quarters of a revolution of the input shaft 10.

FIGURE 4 is a sectional view of the register means, which is schematically indicated in FIGURE 1 at 42. The said means is again operated from the main drive shaft 21 through a suitable cam mechanism, so arranged that the actuation of the register means 42 is effected immediately before punching of the tape 32 takes place.

A wheel 43, having an eccentric pin 44 is mounted on the drive shaft 21 outside the housing 19. The eccentric pin 44 engages a slot 45 in a T-shaped locating finger 46, which is reciprocated by the rotation of the shaft 21 up and down in a guide member 47, which constrains it to a straight line path. The upper end 48 of the locating finger 46 is of such size that it can engage the spaces between the teeth 49 on a sixteen-tooth serrated wheel 50, which is mounted on the input shaft 10, and the tooth spaces of which correspond to the angular locations of the calibration holes on the encoder drums 11, 12.

The register means locating finger 46 also carries a spring loaded auxiliary member 51, which is disposed at such an angle relative to the finger 46 itself that, when the finger 46 is directly and centrally in alignment with a space between the teeth 49, the member 51 does not contact the tips of the teeth 49 as the end 48 enters into the said space and thereby locks the wheel 50, and with it the input shaft 10 and the encoding drums 11, 12 in position for a tape perforating operation. When, however, this alignment is not present, the auxiliary member 51 is first displaced, against the restoring force of its spring 52, on coming into contact with a tooth 49, but thereafter pushes the toothed wheel 50 into a position where it can be engaged by the locating finger 46 in the manner already described. This position is the one where the ends 30 of the punches 25, 26 can freely enter the calibrating holes in the drums 11, 12 without jamming.

It will be appreciated that such positional adjustment of the encoding drums 11, 12 must introduce a small error in the reading eventually logged on tape. This is, of course, quite inevitable, but in the particular apparatus here described the maximum possible error could be only 0.4%, which would be quite acceptable for most applications intended for the apparatus.

FIGURE 5 shows the developed surface of the encoding drum 12. The position of the holes 53 indicates the positions where punching will not occur, and the code positions 54 where there are no holes, are the positions where the tape will be perforated. As already explained, there are sixteen recording positions along the circumference of the encoding drum, i.e., these positions are spaced at 22½° angular intervals.

The operation of the apparatus has already been described with reference to the functioning of each particular part. The entire sequence is that the main drive motor is first actuated, usually automatically, at given preset time intervals at which the recording of data is desired. The main drive shaft 21 starts to turn, and first causes the tape 32 to be drawn forward over the female punch frame 29. Then the register means 42 is operated until the end 48 of the locating finger 46 has locked the wheel 50, and with it the input shaft 10 and both encoding drums in the correct punching position. Then the carriage 20 is moved upward against the punches 25, 26 and perforation of the tape 32 takes place; and finally, on the return movement of the carriage 20, the retracting plate 27 withdraws the punches 25, 26 from the tape 32. This operational sequence is then repeated when the next set of data has to be logged. Alternatively, in multichannel operation, sequential punching operations may record different information, as required.

A feature of the device according to this invention is that the frictional load and inertia, which are added to the chart recorder on coupling a data logging device to it, are kept to a minimum, because the device does not employ any springloaded balls, rollers or like locating means which impose a heavy load on the recorder. Another advantage is that an accuracy of about 0.4% is possible of achievement with a single punching and an eight digit binary code. As the device is designed for use with variables which change comparatively slowly with reference to time, it is considered that parity checking can be dispensed with. However, if desired, this feature can be incorporated in conventional manner with a small sacrifice in accuracy. A still further advantage is that wear on the potentiometer of the recorder is kept to a minimum because the moving contact does not have to return to zero between successive punching operations, as is the case with some analogue-to-digital conversion systems. Instead, the input shaft of the apparatus of this invention is always coupled to a continuously reading recorder.

The encoding drum arrangement and the method of tape punching according to the invention can also be made use of if greater accuracy of recording of readings is desired. Thus, for example, if two separately mounted encoding drums are used and two sequential punchings are made, an accuracy of 0.1% could be achieved with only a five hole tape, at the expense of some mechanical complication, and assuming that the servosystem concerned can produce this accuracy. Where an increase in potentiometer accuracy is required, it may be convenient to replace the existing recorder slide wire with, say, a twenty turn "helipot," giving an equivalent slide wire length of 30 inches or more.

A further possible variation could involve the driving of the punch input shaft with a selsyn or a stepper motor driven by pulses generated by the slide wire drive. This arrangement would reduce the mechanical load on the servosystem to a minimum, but introduces the possibility of the potentiometer and the tape punch getting "out of step," without it being obvious that this had occurred. These and other modifications are to be construed as being within the spirit and scope of the present invention as defined in the claims.

I claim:

1. A punch tape data logging apparatus comprising an input shaft the rotational displacement of which is proportional to the instantaneous value of a variable which is being detected and has to be logged on tape; two cylindrical encoding drums mounted on said input shaft, a first of said drums being rotationally coupled to said input shaft, while a second of said drums is freely mounted on said input shaft, but is drivingly coupled to it through an intermittent movement mechanism, a lay shaft actuated by said intermittent movement mechanism and a reduction gearing mounted on said lay shaft; a locking device associated with the said second drum and the lay shaft, being operative to ensure that said lay shaft does not rotate when not drivingly coupled to said input shaft through the intermittent movement mechanism; a series of holes formed in axially separated and circumferentially aligned zones on the surface of each of said drums, said holes being located in the zones in accordance with any suitable code capable of rendering instantaneous values of said variable into a chosen data-logging scale for punching on a tape; a set of punches mounted parallelly to each other and movable freely in guide members constraining them to a common plane radial with reference to said drums, each of the punches being aligned with one of said circumferential zones on the surfaces of said drums; a female punch frame having mating apertures in positions corresponding to the locations of the punches; a tape feed means adapted intermittently to move a tape over said female punch frame; means for periodically causing said female punch frame to be moved towards the drums in such a way that one end of each of the punches is engaged by the tape covering the corresponding mating aperture in said female punch frame, whereby the other end of each of the freely movable punches is pushed through its guide member against one of the drums, the distance through which said female punch frame moves being such that said other end of each of those punches of which the first said end is not in register with one of the holes in said drums is forced through its mating aperture in the female punch frame and in so doing perforates said tape.

2. A punch tape data logging apparatus comprising an input shaft the rotational displacement of which may be made proportional to the instantaneous value of a variable which has to be logged on tape; two cylindrical drums mounted on the input shaft, one of said drums being rotationally coupled to said input shaft, and the other of said drums being freely mounted on said shaft, such other drum being coupled to the input shaft through an intermittent movement mechanism; a lay shaft actuated by said intermittent movement mechanism and a reduction gearing between said lay shaft and said other drum; relief calibrations on the surface of all drums; tape perforating punches disposed adjacent to said drums and arranged radially with reference to said drums; a female punch frame having mating apertures in positions corresponding to the locations of the punches; tape feed means adapted to draw a tape over said female punch frame; and means for periodically causing said female punch frame and said drums to be moved towards each other in a plane containing said punches, whereby one end of each of said punches is brought against said drums and the other end of each of those punches, of which the said one end is not in engagement with one of said relief calibrations, is forced through its mating aperture in the female punch frame and in so doing perforates said tape.

3. A punch tape data logging apparatus according to claim 2, and including locking means mounted on said lay shaft for preventing rotation thereof when not in actual driving engagement with the input shaft through said intermittent movement mechanism.

4. A punch tape data logging apparatus comprising an input shaft the rotational displacement of which may be made proportional to the instantaneous value of a variable which has to be logged on tape; at least one cylindrical encoding drum rotationally coupled to said shaft; relief calibrations on the surface of said drum being constituted by holes formed in axially separated circumferential zones; tape perforating punches disposed adjacent to said drum and arranged radially with reference to said drum with one end of each punch being located in registering relationship with respect to the holes in any given circumferential zone, and each of the holes being of such size as to be capable of freely accommodating the said one end of each punch; a female punch frame having mating apertures in positions corresponding to the locations of the punches; tape feed means adapted to draw a tape over said female punch frame at periodic intervals preceding each perforation of the tape; register means comprising a toothed wheel rotationally fixed with reference to said drum and a spring loaded locating finger actuated by an eccentric mechanism associated with said tape feed means, said finger being adapted to engage said toothed wheel between its teeth, and to align said wheel and with it the drum in the correct radial plane of said punches prior to the perforation of the tape; and means for periodically causing said female punch frame and said drum to be moved one towards the other in a plane containing said punches, whereby the said one end of each of said punches is brought against said drum, and the other end of each of those punches, of which the said one end is not in engagement with one of said relief calibrations, is forced through its mating aperture in the female punch frame and in so doing perforates said tape.

References Cited

UNITED STATES PATENTS

| | | | |
|---|---|---|---|
| 779,153 | 1/1905 | Franke et al. | 234—99 |
| 3,117,719 | 1/1964 | Wapner et al. | 234—99 |
| 3,278,117 | 10/1966 | Post et al. | 234—100 |

WILLIAM S. LAWSON, *Primary Examiner.*